Feb. 14, 1956 J. L. PARVIN 2,734,748

DISC PHONOGRAPH RECORDS

Filed April 7, 1951

INVENTOR
John L. Parvin

BY Morris L. Rabkin

ATTORNEY

United States Patent Office 2,734,748
Patented Feb. 14, 1956

2,734,748

DISC PHONOGRAPH RECORDS

John L. Parvin, Merion, Pa., assignor to Radio Corporation of America, a corporation of Delaware Application April 7, 1951, Serial No. 219,822

The terminal 15 years of the term of the patent to be granted has been disclaimed 3 Claims. (Cl. 274—42)

Figure 1:
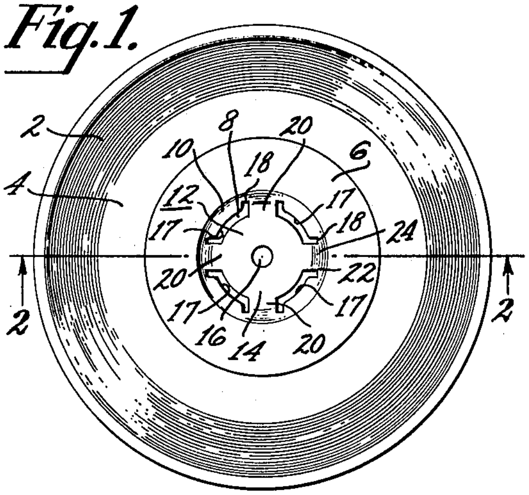

This invention relates to improvements in disc phonograph records and, more particularly, to an improved type of record adaptable to being played on record players having either of two standard diameter spindles.

Since the introduction of long-playing records adapted to be played at lower rotational speeds than the conventional 78 R. P. M., record players have been marketed with spindles of two different standard diameters. One of these is the older style, conventional, narrow spindle, which has been in use for many years. The other is a spindle of relatively large diameter adapted to accommodate in its interior many of the essential parts of a record changing mechanism.

The introduction of the record player having a relatively large diameter spindle has caused a consumer problem. Those consumers who have record players with the large diameter spindle cannot use records which have been manufactured with a small diameter spindle hole. Also, consumers who have record players with the old style small diameter spindle cannot use records manufactured with the larger spindle hole without inserting an adapter. There is also a corresponding problem from the dealer standpoint. Record dealers have had to maintain parallel stocks of records having the two different spindle hole sizes in order to accommodate public demand. Thus, although the introduction of the record player having a relatively large spindle has resulted in considerably greater efficiency and ease of record player operation, it has introduced marketing problems. For the above reasons, it has for some time been recognized as desirable to be able to market a single type of record capable of being played on record players having either of the two spindle diameters.

The obvious solution to the problem of the two spindle diameters appears to be in the manufacture of a record having a small central spindle hole and also having a center portion adapted to be punched out easily by hand, leaving a larger opening having a diameter adapted to fit the large diameter spindles. Although the type of record which was needed has been generally recognized, a practical solution of the problems involved has not been apparent. For example, a record having a central punch-out defined by deep scorings has certain disadvantages. In the first place, if the scorings or grooves are made of such a depth as to require only light pressure to break out the center portion, the material left between the bottoms of the corresponding grooves on either side of the record must be so thin as to fall outside of usual manufacturing tolerances. In other words, it has been found practically impossible to control the thickness of molded record material with the precision necessary to insure that such a type of record would always be molded with just enough thickness of material remaining in the weakened portions to enable the record to be played using the small spindle hole and, at the same time, permit punching out of the center portion with light pressure by the user who wanted to adapt the record to be played on a record player having a larger diameter spindle. Another problem, even more serious, is the fact that when the center is punched out of a record molded in this manner, a burr remains along the line of severance of the punched out central portion from the remainder of the record. This, of course, interferes with placing the record on the spindle unless the burr is broken off or smoothed down in some way.

The present invention is an improved record which eliminates the disadvantages in the universal type of record above referred to.

The primary object of the present invention is to provide an improved disc phonograph record capable of being played on record players having either small diameter spindles or large diameter spindles.

Another object of the invention is to provide an improved disc type phonograph record having a central hub portion capable of being punched out easily by hand and without the use of any special tool.

Another object of the invention is to provide a universal type phonograph record readily adaptable to be played on record players having either one of two standard spindle diameters.

Another object of the invention is to provide an improved phonograph record adapted to be played on record players having either of two standard spindle diameters and having a central hub portion which can be punched out without leaving a burr which will interfere with placing the record over a large diameter spindle.

Figure 3:
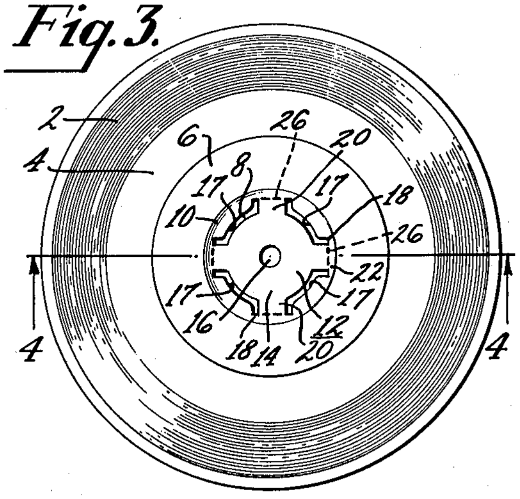
Figure 2:
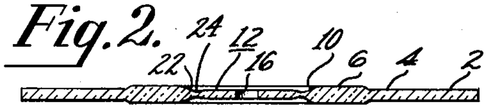
Figure 4:
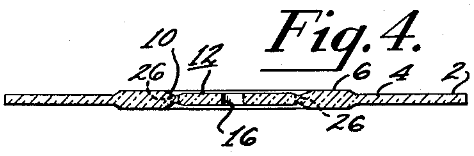
Figure 5:
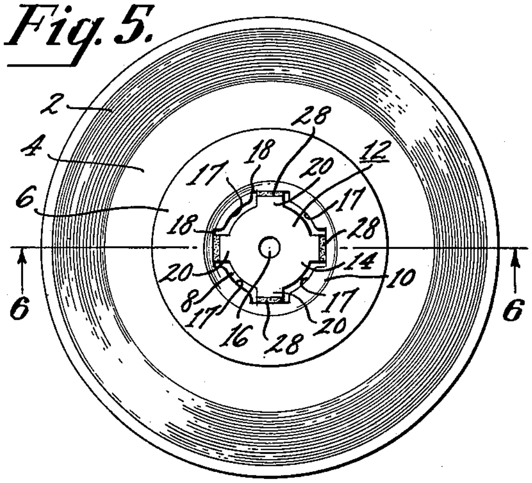
Figure 7:
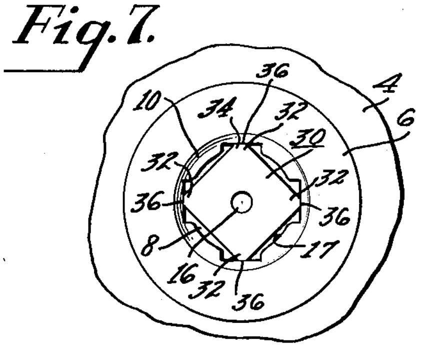
Figure 6:
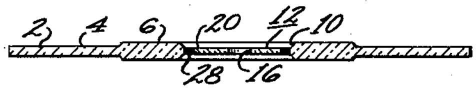
Figure 8:
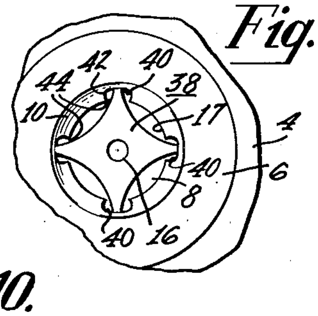
Figures 9, 10:
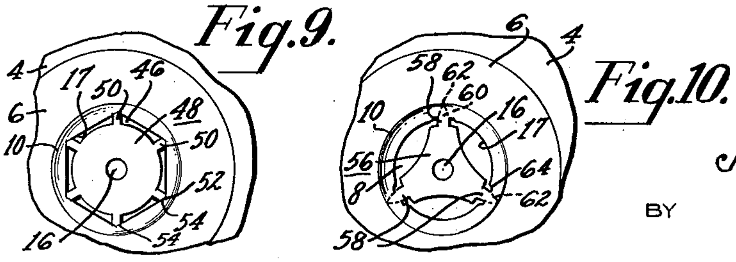

These and other objects will be more apparent and the invention will be more readily understood from a consideration of the following detailed description and the accompanying drawings, of which:

Figure 1 is a plan view of one embodiment of record in accordance with the present invention, Figure 2 is a cross section view taken along the line 2—2 of Figure 1, Figure 3 is a plan view of another modification of record in accordance with the present invention, Figure 4 is a cross section view taken along the line 4—4 of Figure 3, Figure 5 is a plan view of a third modification of record in accordance with the present invention, Figure 6 is a cross section view taken along the line 6—6 of Figure 5, Figure 7 is a plan view of the central portion only of a phonograph record in accordance with the present invention, utilizing a central punch-out of somewhat different configuration, Figure 8 is a plan view of the central portion only of another modification of a record in accordance with the present invention and illustrating still another configuration of the central punch-out, Figure 9 is a plan view of the central portion only of an improved phonograph record in accordance with the present invention and having a large spindle opening of polygonal form rather than the conventional circular form, and Figure 10 is a plan view of the central portion only of still another embodiment of an improved phonograph record in accordance with the present invention.

The improved record of the present invention is provided with a relatively large spindle opening adapted to fit standard, large diameter spindles, the opening having portions of relatively smaller and larger dimensions as measured from a common center. Disposed in this large spindle opening is a hub portion provided with a relatively small diameter center hole and including sections connecting said hub portion to the remainder of the record at at least the aforementioned large spindle opening portions of larger dimensions. In order that the hub portion may be broken away easily from the remainder of the record, the connecting sections may have portions which are weakened either by molding them so that they are relatively thin or by providing grooves or scorings at their points or areas of connection with the main portion of the record.

Referring to Figures 1 and 2, a phonograph record in accordance with one embodiment of the present invention will now be described.

The record may comprise a portion 2 carrying a conventional sound track, another portion 4 disposed radially inwardly of the sound track portion and having grooves for operating an automatic record changing mechanism and a label portion 6 disposed radially inwardly of the changer-operating groove portion. The label area may be, but is not necessarily, of greater thickness than either the portion carrying the sound track or the portion carrying the record changer grooves. The central area of the record has a relatively large diameter spindle opening 8 dimensioned to fit standard large diameter record player spindles. The portion 10 of the label area adjacent the center hole 8 is tapered to facilitate the operation of the record supporting blades in conventional automatic record changer mechanism commonly used in conjunction with record players having large diameter spindles.

Disposed in the large diameter spindle opening 8 is a center hub portion 12 which is adapted to be easily removed by the consumer when the consumer wishes to use the record on a record player of the type having a large diameter spindle. This hub portion comprises a web 14 of the same material as the remainder of the record and integrally molded therewith when the record is pressed. The hub portion is provided with a central spindle hole 16 of relatively small diameter adapted to fit the conventional small diameter record player spindles.

The hub portion is constructed so as to be sufficiently strong at all points to enable normal usage on a record player having a small diameter spindle and, at the same time, to have particular features which enable it to be easily punched out or otherwise broken away from the remainder of the record without the use of any special tool and without leaving any burrs which will interfere with the normal operation of a record player having a large diameter spindle, whether or not the record player includes automatic record changer mechanism. In the embodiment presently being described, the large spindle opening 8 is provided with a plurality of indentations 18. Within these indentations, the periphery of the large diameter center opening is farther distant from the central axis of the record than the parts 17 of the periphery of the opening which are adapted to fit snugly around the spindle of the record player. The depth of the indentations 18, however, must be substantially less than the width of the record changer blades, where the record is to be used on an automatic changer of conventional type, so that the record will not slip down past the blades when they are in their outwardly extended position.

The web portion 14 includes sections 20, which may be, but are not necessarily, radially outwardly extending arms, connecting the hub portion to the periphery of the large diameter spindle hole within the indentations 18. Within the areas 22, where connecting sections merge with the label area of the record, weakened portions 24 are provided. These weakened portions may be merely portions of minimum thickness of material. Thus, when pressure, as from the thumbs of the consumer, is brought to bear on the hub portion of the record, it will tend to break within the areas which are weakened.

The break need not be a clean one and, in most cases, will not be clean. Since the burr which remains will be radially outside of the diameter of the main portion of the periphery of the spindle hole, it will not prevent the user from slipping the record over a large diameter spindle. Moreover, since the burr will be of minimum thickness, it will not prevent the normal operation of the blades in conventional record changer mechanisms.

Another embodiment of the present invention is illustrated in Figures 3 and 4. In this embodiment, the record includes the same principal parts described in connection with the previous embodiment but differs somewhat in the structure of the weakened portion connecting the hub portion of the record to the remainder of the record. In this case, the hub portion 12 has radially outwardly extending arms 20, as in the previous embodiment, but the weakened portions of the connecting sections 22 are constituted by deeply indented score lines 26. These score lines may be impressed in the record during the manufacturing process at the same time that the hub portion of the record is formed by dinking or punching out excess material. The use of score marks has considerable advantages over merely forming the weakened sections by molding them to greater thinness than the remainder of the record. The principal advantage is that exact molding tolerances need not be maintained as when very thin sections must be molded. This greatly reduces the number of rejects in a production run and decreases considerably the overall cost of manufacturing the records. At the same time, it is easier to punch the hub portion out of the record by thumb pressure when score marks of proper design are used than when thin sections are molded into the record. When score marks are used, it is also possible to control the product such that more uniform pressure will be required to punch out the hub portion as between one record and another.

A third embodiment of the invention is illustrated in Figures 5 and 6. The record illustrated in this embodiment also includes the same principal parts as the records described in the previous embodiments but the manner of connecting the hub portion to the remainder of the record is different. In this case, the hub portion 12, instead of being integrally molded with the remainder of the record, may be molded separately. The connecting sections 20 are then joined to the peripheries of the indentations 18 by means of a thin layer of a cementing agent 28. The cementing agent may be any of the well known resin cements which are applied from an organic solvent solution. For example, cellulose nitrate or acetate dissolved in acetone may be employed. Where the record is made of a thermoplastic resinous material, the cementing agent may be merely the heat softened resin of the record, itself, with the hub portion being fitted in when the resin in the indentations has been softened by the application of heat. When it is desired to use this type of record on a record player having a large diameter spindle, the hub portion is merely punched out by thumb pressure, as in the previous modifications. In this case, only a thin line of cement will remain in the indentations, and this has no effect on record changer operations since it is present entirely outside the principal diameter of the spindle hole.

Various other modifications of the present invention are illustrated in Figures 7, 8, 9. and 10.

In Figure 7, there is shown a record having a hub portion 30 of rectangular configuration. The corners 32 of the rectangle constitute the connecting sections and, in this instance, the weakened portions 34 are constituted by grooves 36, which are present on both faces of the record. Instead of grooves, the score marks, as illustrated in the embodiments of Figures 3 and 4, or the thin molded sections, as illustrated in Figures 1 and 2, may be used.

In the modification shown in Figure 8, the hub portion 38 is a web of generally rectangular form but having concave edges. The indentations in the periphery of the large diameter spindle hole have outwardly curved sides 42. In this modification, the entrance openings 44 to the indentations 40 are of minimum length. This type of indentation offers the least interference with operation of the blades of the conventional type record changer mechanism associated with record player spindles of large diameter.

The large diameter spindle hole of the record need not be circular in shape. As shown in Figure 9, the large diameter spindle hole 46 may be polygonal in form. In the illustration, the hexagonal shape is shown but this may obviously be a polygon having four sides or more. When a square spindle hole is used, use of the record in a record player not having automatic changing mechanism is just as satisfactory as when the spindle hole is circular in shape. Where automatic record changer mechanism is present, however, it is preferable to use a form of spindle hole having more than four sides so that there will be no space between the spindle and the periphery of the spindle hole, which is large enough to pass over one of the record changer blades when it is in its outwardly extended position. In the form of the invention shown in Figure 9, the hub portion 48 is connected to the remainder of the record through connecting sections 50 extending radially outwardly from the hub portion to the corners 52 of the polygon defining the periphery of the large spindle hole. The connecting sections 52 are provided with weakened portions 54, as in the other embodiments of the invention, and these weakened portions may be grooves, score marks, or thin molded sections, as previously described.

Still another modification of the invention is shown in Figure 10. In this form, the hub portion 56 is shown as having a generally triangular shape. The hub portion is provided with connecting sections 58 having portions 60 extending beyond the principal diameter of the large diameter spindle hole and merging with the label portion of the record. These portions 60, extending into the label area of the record, may have any convenient form, such as conical, frustoconical, or rectangular, to name but a few possible variations, and they may be made quite small in area. Weakened portions 62 are formed in this case by scoring or grooving along the outlines of the extended portions 60. The periphery of the large spindle hole may have offset portions 64 adjacent the connecting sections 58, although this is not absolutely necessary. In this case, the indentations in the periphery of the record may be regarded as the notches that will be evident when the hub portion, including the connecting sections 58, is punched out. The offset portions may be included only to be certain that no burrs will remain projecting within the principal diameter of the large diameter spindle hole.

There has thus been described an improved type of phonograph record that the consumer can either use, just as bought, with record players having small diameter spindles or that he may easily adapt for playing on record players having large diameter spindles, by merely punching out a hub portion. Various modifications of the invention have been shown and others are obviously possible without departing from the scope or spirit thereof. The essential improvement lies in providing a structure which permits a central slug to be removed easily without leaving a burr which interferes with subsequent use of the record. On the other hand, the central hub portion of the record may be integrally molded to the rest of the record when it is pressed and is sufficiently strong to permit normal, and even rough, usage if the record is played on an old style player having a small diameter spindle.

In any of the modifications illustrated, with the exception of that shown in Figure 10, connecting sections need not extend to all of the portions of the large spindle opening of relatively larger dimensions. In the modification of the invention illustrated in Figure 9, for example, alternate ones of the connecting sections 50 may be omitted, if desired.

I claim as my invention:

1. A disc phonograph record having a relatively large diameter spindle opening therein, said opening being provided with a plurality of indentations in the periphery thereof, and a hub portion disposed within said opening, said hub portion comprising a unitary structure with said record and having a part provided with a relatively small diameter spindle hole and including sections connecting said part to said periphery only at said indentations, whereby said hub portion may be easily broken away from the remainder of said record within said indentations, said connecting sections being integral with the remainder of the record, the thickness of said sections being a minimum at their areas of connection to said periphery, the thickness of said sections increasing gradually on both sides of said areas.

2. A disc phonograph record having a relatively large diameter spindle opening therein, said opening being provided with a plurality of indentations in the periphery thereof, and a hub portion disposed within said opening, said hub portion comprising a part provided with a relatively small diameter spindle hole and including sections connecting said part to said periphery only at said indentations, said connecting sections being integral with the remainder of the record, and the areas in which said sections are connected to said indentations being provided with weakened portions whereby said hub portion may be easily broken away from the remainder of said record.

3. A record according to claim 2 wherein said weakened portions include scorings.

References Cited in the file of this patent

UNITED STATES PATENTS

| | | |
|---|---|---|
| 874,985 | O'Neill | Dec. 31, 1907 |
| 2,283,797 | Dech | May 19, 1942 |
| 2,585,622 | Bridenbaugh et al. | Feb. 12, 1952 |
| 2,619,351 | Kennedy | Nov. 25, 1952 |

FOREIGN PATENTS

| | | |
|---|---|---|
| 701,518 | France | Mar. 17, 1931 |
| 124,508 | Austria | Sept. 25, 1931 |
| 725,759 | France | May 18, 1932 |